United States Patent [19]

Kiehs et al.

[11] 3,854,927

[45] Dec. 17, 1974

[54] PROCESS FOR CONTROLLING THE GROWTH OF UNWANTED PLANTS

[75] Inventors: Karl Kiehs; Karl-Heinz Koenig, both of Ludwigshafen; Adolf Fischer, Mutterstadt, all of Germany

[73] Assignee: Badische Anilin- & Soda-Fabrik Aktiengesellschaft, Ludwigshafen/Rhein, Germany

[22] Filed: May 11, 1973

[21] Appl. No.: 359,242

Related U.S. Application Data

[60] Continuation-in-part of Ser. No. 92,190, Nov. 23, 1970, abandoned, which is a division of Ser. No. 784,247, Dec. 16, 1968, Pat. No. 3,681,425.

[30] Foreign Application Priority Data

Dec. 21, 1967  Germany............................ 1643719

[52] U.S. Cl. .................................................. 71/121
[51] Int. Cl.............................................. A01n 9/20
[58] Field of Search ...................................... 71/121

[56] References Cited

UNITED STATES PATENTS 3,257,190   6/1966   Soper................................... 71/121

Primary Examiner—Lewis Gotts
Assistant Examiner—Catherine L. Mills
Attorney, Agent, or Firm—Johnston, Keil, Thompson & Shurtleff

[57] ABSTRACT

Process for controlling the growth of unwanted plants with N-β-chloroethyl-N-lower alkyl or allyl-2,6-dinitro-4-trifluoromethylanilines.

2 Claims, No Drawings

PROCESS FOR CONTROLLING THE GROWTH OF UNWANTED PLANTS

RELATED APPLICATIONS

This application is a continuation-in-part of our application Ser. No. 92,190, filed Nov. 23, 1970 now abandoned, which is a division of U.S. application Ser. No. 784,247, filed Dec. 16, 1968, now U.S. Pat. No. 3,681,425.

The present invention relates to a process for controlling the growth of unwanted plants with N-β-chloroethyl-N-lower alkyl or allyl-2,6-dinitro-4-trifluoromethylanilines.

An object of the invention is a process for controlling the growth of unwanted plants with minimum damage to crop plants.

This and other objects of the invention are achieved by substituted dinitroanilines having the formula

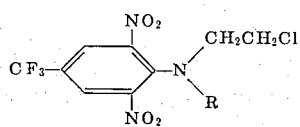

wherein R is allyl or lower alkyl (methyl, ethyl or propyl). These substituted dinitroanilines have good herbicidal action and, when compared with active ingredients of similar constitution, have superior plant compatibility.

The new compounds may be applied as herbicides as solutions, emulsions, suspension or dusts. The form of application depends entirely on the purpose for which the agents are being used; in any case it should ensure a fine distribution of the active ingredient.

For the preparation of solutions to be sprayed direct, mineral oil fractions with medium to high boiling points, such as kerosine or diesel oil coal tar oils and oils of vegetable or animal origin, cyclic hydrocarbons, such as tetrahydronaphthalene, and alkylated naphthalenes are suitable.

Aqueous formulations may be prepared from emulsion concentrates, pastes or wettable powders by adding water. To prepare emulsions the ingredients as such or dissolved in a solvent may be homogenized in water by means of wetting or dispersing agents, e.g., a polyethylene oxide adduct. Concentrates which are suitable for dilution with water may be prepared from active ingredient, emulsifying or dispersing agent and possibly solvent.

Dusts may be prepared by mixing or grinding the active ingredients with a solid carrier, e.g., diatomaceous earth or fertilizers.

The new compound may be prepared for example by reaction of substituted dinitrochlorobenzenes with substituted amines. They are crystalline or non-distillable oils.

The following Examples illustrate the preparation of specific compounds according to this invention.

EXAMPLE 1

Preparation of N-hydroxyethyl-N-allyl-2,6-dinitro-4-trifluoromethylaniline 10.1 parts by weight of N-allyl-N-hydroxyethylamine is added to a solution of 13.5 parts by weight of 2,6-dinitro-4-trifluoromethylchlorobenzene in 50 parts by weight of dry tetrahydrofuran and the whole boiled under reflux for one to two hours. The solvent is then distilled off, the residue treated with ethyl acetate/water, and the organic phase is removed and dried over sodium sulfate. After the ethyl acetate has been distilled off, the product is obtained as a red-brown oil (93 percent of the theory).

Analysis:

|  | C | H | N |
|---|---|---|---|
| calc.: | 43.0 | 3.6 | 12.5 |
| found: | 43.2 | 3.6 | 12.0 |

EXAMPLE 2

Preparation of N-chloroethyl-N-allyl-2,6-dinitro-4-trifluoromethylaniline 16.7 parts by weight of N-hydroxyethyl-N-allyl-2,6-dinitro-4-trifluoromethylaniline is dissolved in 50 parts by weight of benzene. After adding 1 part by weight of dimethylformamide and dripping in 30 parts by weight of thionyl chloride at room temperature the whole is boiled for two hours under reflux. The volatile constituents are distilled off from the reaction mixture at 20 mmHg, the residue is taken up in ethyl acetate, the solution is washed with ice-water, then with 10 percent sodium bicarbonate solution and finally again with water and the organic phase is dried over sodium sulfate.

After distilling off the solvent a dark brown oil (95 percent of the theory) is obtained from which, after purifying over silica gel (benzene), yellow crystals may be isolated which have a melting point of 39° to 41°C.

Analysis:

|  | C | H | N | Cl |
|---|---|---|---|---|
| calc.: | 40.7 | 3.1 | 11.9 | 10.0 |
| found: | 40.4 | 3.2 | 11.6 | 9.9 |

Examples of substances prepared in the same way are the N-lower alkyl compounds of the above formula wherein the alkyl group is methyl, ethyl or propyl instead of alkyl.

The following comparative experiment demonstrates the superiority of the compositions according to this invention over known active ingredients.

EXAMPLE 3

In a greenhouse, loamy sandy soil is filled into pots and then sown with the seeds of cotton (Gossypium sp.), Indian corn (Zea mays), soya beans (Glycine hispida), annual meadow grass (Poa annua), orchard grass (Dactylis glomerata), slender foxtail (Alopecurus myosuroides) and barnyard grass (Panicul crus-galli). The soil prepared in this manner is treated with 3 kg per hectare of N-allyl-N-β-chloroethyl-4-trifluoromethyl-2,6-dinitroaniline (I), and, for comparison, with 3 kg per hectare of N,N-dipropyl-4-trifluoromethyl-2,6-dinitroaniline (II), these amounts of the active ingredients each being dispersed in 500 liters of water per hectare. After four weeks it is ascertained that compound I, while having the same good herbicidal action as compound II, has superior compatibility with Indian corn and soya beans.

The results of the experiment may be seen from the following table:

|  | Active Ingredient | |
|---|---|---|
|  | I | II |
| Crop plants: | | |
| Cotton | 0–10 | 0–10 |
| Indian corn | 10–20 | 30–40 |
| Soya beans | 10 | 30 |
| Unwanted plants: | | |
| Annual meadow grass | 100 | 100 |
| Orchard grass | 100 | 100 |
| Slender foxtail | 90–100 | 90–100 |
| Barnyard grass | 90–100 | 90–100 |

0 = no damage
100 = total destruction

EXAMPLE 4

Loamy, sandy soil was sown with cotton (Gossypium hirsutum), rice (Oryza sativa), soya beans (Soja hispida), Indian corn (Zea mays), large crabgrass (Digitaria sanguinalis), giant foxtail (Setaria faberii), wild oats (Avena fatua), slender foxtail (Alopecurus myosuroides) and Italian ryegrass (Lolium multiflorum). The soil was then treated with I    N-propyl-N-ethyl-2,6-dinitro-4-trifluoromethylaniline and, for comparison, with II    N-propyl-N-β-chloroethyl-2,6-dinitro-4-trifluoromethylaniline.

The application rates for each active ingredient were 0.5, 0.75, 1.0, 1.5, 2.0, 2.5 and 3.0 kg per hectare, each amount being dispersed in 600 liters of water per hectare.

The results contained in the following table were obtained 4 to 5 weeks after sowing.

These results show that compound I causes heavier damage to the crop plants than compound II. Furthermore, the herbicidal action of compound I, particularly at application rates of 0.5, 0.75, 1.0 and 1.5 kg per hectare of active ingredient and especially on Digitaria sanguinalis, Setaria faberii, Avena fatua and Lolium multiflorum, is considerably weaker than that of II.

TABLE

| Active ingredient kg/ha | I | | | | | | |
|---|---|---|---|---|---|---|---|
| | 0.5 | 0.75 | 1.0 | 1.5 | 2.0 | 2.5 | 3.0 |
| Crop plants: | | | | | | | |
| Gossypium hirsutum | 0 | 0 | 0 | 0 | 0 | 23 | 30 |
| Oryza sativa | 25 | 40 | 50 | 80 | 90 | 100 | 100 |
| Soja hispida | 0 | 0 | 0 | 0 | 10 | 35 | 43 |
| Zea mays | 0 | 0 | 30 | 35 | 40 | 50 | 55 |
| Unwanted plants: | | | | | | | |
| Digitaria sanguinalis | 60 | 90 | 90 | 95 | 100 | 100 | 100 |
| Setaria faberii | 57 | 90 | 95 | 100 | 100 | 100 | 100 |
| Avena fatua | 28 | 50 | 65 | 80 | 90 | 100 | 100 |
| Alopecurus myosuroides | 56 | 90 | 95 | 100 | 100 | 100 | 100 |
| Lolium multiflorum | 50 | 70 | 90 | 95 | 100 | 100 | 100 |

TABLE — Continued

| Active ingredient kg/ha | II | | | | | | |
|---|---|---|---|---|---|---|---|
| | 0.5 | 0.75 | 1.0 | 1.5 | 2.0 | 2.5 | 3.0 |
| Crop plants: | | | | | | | |
| Gossypium hirsutum | 0 | 0 | 0 | 0 | 0 | 4 | 10 |
| Oryza sativa | 0 | 20 | 30 | 30 | 40 | 45 | 45 |
| Soja hispida | 0 | 0 | 0 | 0 | 10 | 10 | 10 |
| Zea mays | 0 | 0 | 15 | 25 | 30 | 35 | 40 |
| Unwanted plants: | | | | | | | |
| Digitaria sanguinalis | 80 | 100 | 100 | 100 | 100 | 100 | 100 |
| Setaria faberii | 78 | 98 | 100 | 100 | 100 | 100 | 100 |
| Avena fatua | 50 | 80 | 95 | 100 | 100 | 100 | 100 |
| Alopecurus myosuroides | 70 | 100 | 100 | 100 | 100 | 100 | 100 |
| Lolium multiflorum | 75 | 95 | 100 | 100 | 100 | 100 | 100 |

0 = no damage
100 = complete destruction

We claim:

1. A process for controlling the growth of unwanted plants in crops wherein the soil in which the growth of the unwanted plants is to be prevented is treated with a phytotoxic quantity of a compound having the formula

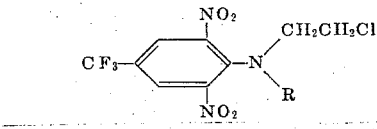

where R denotes lower alkyl.

2. A process as claimed in claim 1 wherein 2,6-dinitro-4-trifluoromethyl-N-propyl-N-β-chloroethylaniline is used.

* * * * *